US 9,443,142 B2

(12) United States Patent
Reynolds, Jr.

(10) Patent No.: US 9,443,142 B2
(45) Date of Patent: Sep. 13, 2016

(54) VISION-BASED SYSTEM FOR DYNAMIC WEATHER DETECTION

(71) Applicant: EXELIS, INC., McLean, VA (US)

(72) Inventor: William D. Reynolds, Jr., Durham, NC (US)

(73) Assignee: Exelis, Inc., Herndon, VA (US)

( * ) Notice: Subject to any disclaimer, the term of this patent is extended or adjusted under 35 U.S.C. 154(b) by 153 days.

(21) Appl. No.: 14/339,891

(22) Filed: Jul. 24, 2014

(65) Prior Publication Data

US 2016/0026865 A1    Jan. 28, 2016

(51) Int. Cl.
*G06K 9/00*    (2006.01)
*G06T 7/00*    (2006.01)

(52) U.S. Cl.
CPC ....... *G06K 9/00624* (2013.01); *G06K 9/00711* (2013.01); *G06T 7/0075* (2013.01); *G06T 7/0081* (2013.01); *G06T 2207/10012* (2013.01)

(58) Field of Classification Search
CPC ................. G06K 9/00624; G06K 9/00711; G06K 7/0081
See application file for complete search history.

(56) References Cited

U.S. PATENT DOCUMENTS

| | | | | |
|---|---|---|---|---|
| 6,625,310 B2 * | 9/2003 | Lipton | ............... | G06K 9/00771 375/240.01 |
| 7,098,618 B2 | 8/2006 | Morishita | | |
| 8,436,902 B2 * | 5/2013 | Kuehnle | ................. | G01W 1/14 348/142 |
| 2007/0280504 A1 * | 12/2007 | Badawy | ............. | G06K 9/00711 382/104 |
| 2010/0040285 A1 * | 2/2010 | Csurka | ............... | G06K 9/00624 382/170 |
| 2012/0008866 A1 * | 1/2012 | Halimeh | ............ | G06K 9/00791 382/190 |
| 2013/0242188 A1 | 9/2013 | Tripathi et al. | | |

FOREIGN PATENT DOCUMENTS

EP    1521694    7/2008

OTHER PUBLICATIONS

Hautiere, N., Bossu, J., Biogorgne, E., Hilblot, N., Boubezoul, A., Lusetti, B. and Aubert,D., "Sensing the Visibility Range at Low Cost in the Safespot Roadside Unit". 2009.*
International Search Report and Written Opinion of the International Searching Authority, International Application No. PCT/US2015/041960, dated Jan. 12, 2016.
Garg, K. and Nayar, S. K., "Vision and Rain", *International Journal of Computer Vision*, 2007.

(Continued)

*Primary Examiner* — Bhavesh Mehta
*Assistant Examiner* — Ian Lemieux
(74) *Attorney, Agent, or Firm* — RatnerPrestia

(57) ABSTRACT

A method of detecting a dynamic weather event includes the steps of: (a) receiving video images of a scene from a camera; (b) dividing each of the video images into multiple regions, in which a region is defined by a range of distances from the camera to objects in the scene; (c) selecting a region; and (d) segmenting the selected region into a plurality of three-dimensional (3D) image patches, in which each 3D image patch includes a time-sequence of T patches, with each patch comprised of N×M pixels, wherein N, M and T are integer numbers. The method also includes the following steps: measuring an image intensity level in each of the 3D image patches; masking 3D image patches containing image intensity levels that are above a first threshold level, or below a second threshold level; and extracting features in each 3D image patch that is not discarded by the masking step. Based on the extracted features, the method makes a binary decision on detecting a dynamic weather event.

17 Claims, 15 Drawing Sheets

(56) References Cited

OTHER PUBLICATIONS

Tripathi, A.K. and Mukhopadhyay, S., "Removal of rain from videos: a review", Signal, Image and Video Processing, Sep. 2012.
Narasimhan, S. G., et al., "Vision and the Atmosphere", *International Journal of Computer Vision*, vol. 48, No. 3, pp. 233-254, 2002.
Jacobs, N., et al., "The Global Network of Outdoor Webcams: Properties and Applications", *ACM GIS'09*, Nov. 2009.
Wang, D.J., Chen, T.H., Liau, H.S. and Chen, T.Y., "A DCT-Based Video Object Segmentation Algorithm for Rainy Situation Using Change Detection", *IEEE International Conference on Innovative Computing, Information and Control (ICICIC)*, 2006.
Gunn, R. and Kinzer, G.D., "The Terminal Velocity of Fall for Water Droplets in Stagnant Air", *Journal of Meteorology*, vol. 6, pp. 243-248, Aug. 1949.
Beard, K. V. and Chuang, C., "A New Model for the Equilibrium Shape of Raindrops", *Journal of the Atmospheric Sciences*, vol. 44, No. 11, pp. 1509-1524, Jun. 1987.
Elgammal, A., Harwood, D., Davis, L.,"Non-parametric Model for Background Subtraction", *Proceedings of the European Conference on Computer Vision*, Dublin, Ireland, vol. II, pp. 751-767, 2000.
Radke, Richard J., et al., "Image Change Detection Algorithms: A Systematic Survey", *IEEE Transactions on Image Processing*, vol. 14, No. 3, pp. 294-307, Mar. 2005.
Tripathi, A.K. and Mukhopadhyay, S., "A probabilistic approach for detection and removal of rain from videos", *IETE Journal of Research*, vol. 57, No. 1, pp. 82-91, 2011.
Tripathi, A.K. and Mukhopadhyay, S., "Meteorological approach for detection and removal of rain from videos", *IET Computer Vision*, vol. 7, Issue 1, pp. 36-47, 2013.
Renhorn, I.G.E, Svensson, T., Carlsson, G., Cronström, S. and Boreman, G.D., "Infrared image scintillation: comparison of modeling and measurement", *Optical Engineering*, vol. 45, No. 1, Jan. 2006.
Zhao, X., Liu, P., Liu, J. and Tang, X., "Removal of dynamic weather conditions based on variable time window", IET Computer Vision, vol. 7, Issue 4, pp. 219-226, 2013.
Wang, T. and Clifford, S.F., "Use of rainfall-induced optical scintillation to measure path-averaged rain parameters", Journal of the Optical Society of America, vol. 65, No. 8, pp. 927-937, Aug. 1975.
Koenderink, J.J. and Richards, W.A., "Why is snow so bright?", *Journal Optical Society of America*, vol. 9, No. 5, pp. 643-648, May 1992.
Santhaseelan, V. and Asari, V.K., "A Phase Space Approach for Detection and Removal of Rain in Video", *Proceedings of SPIE: Intelligent Robots and Computer Vision XXIX: Algorithm and Techniques*, vol. 8301, 2012.
Xue, X., Jin, X., Zhang, C. and Goto, S., "Motion Robust Rain Detection and Removal from Videos", *IEEE MMSP*, pp. 170-174, 2012.
Krishnan, S. and Venkataraman, D., "Restoration of Video by Removing Rain", *International Journal of Computer Science, Engineering and Applications (IJCSEA)*, vol. 2, No. 2, pp. 19-28, Apr. 2012.
Tripathi, A.K. and Mukhopadyay, S., "Video post processing: low-latency spatiotemporal approach for detection and removal of rain", *IET Image Processing*, vol. 6, Issue 2, pp. 181-196, 2012.
Shen, M. and Xue, P., "A Fast Algorithm for Rain Detection and Removal from Videos", *IEEE International Conference on Multimedia Expo (ICME)*, pp. 1-6, 2011.
Zhang, X., Li, H., Qi, Y., Leow, W.K. and Ng, T.K., "Rain Removal in Video by Combining Temporal and Chromatic Properties", *IEEE International Conference on Multimedia Expo (ICME)*, pp. 461-464, 2006.
Zhou, M., Zhu, Z., Deng, R. and Fang, S., "Rain Detection and Removal of Sequential Images", *IEEE Chinese Control and Decision Conference (CCDC)*, pp. 615-618, 2011.
Santhaseelan, V. and Asari, V.K., "Phase Congruency Based Technique for the Removal of Rain from Video", *ICIAR*, pp. 30-39, 2011.
Sathita, K., Ochiai, H. and Esaki, H., "RainWatch Project: Location-Awared Realtime Detection and Notification of Rain on Internet-Based Sensor Network", *IEEE Ninth Annual International Symposium on Applications and the Internet*, pp. 259-262, 2009.
Liu, P., Xu, J., Liu, J. and Tang, X., "Pixel based Temporal Analysis Using Chromatic Property for Removing Rain from Videos", *Computer and Information Sciences*, vol. 2, No. 1, pp. 53-60, Feb. 2009.
Barnum, P.C., Narasimhan, S. and Kanade, T., "Analysis of Rain and Snow in Frequency Space", *International Journal on Computer Vision (Online)*, Jan. 2009.
Barnum, P., Kanade, T. and Narasimhan, S.G., "Spatio-Temporal Frequency Analysis for Removing Rain and Snow from Videos", *Proceedings of the First International Workshop on Photometric Analysis for Computer Vision (PACV)*, 2007.
Zhao, X., Liu, P., Liu, J. and Tang, X., "The Application of Histogram on Rain Detection in Video", *Proceedings of the 11th Joint Conference on Information Sciences*, pp. 1-6, 2008.
Hautière, N., Bigorgne, E., Bossu, J. and Aubert, D., "Meteorological Conditions Processing for Vision-based Traffic Monitoring", *Dans: The Eighth International Workshop on Visual Surveillance (VS2008)*, 2008.
Garg, K. and Nayar, S.K., "Detection and Removal of Rain from Videos", *Proceedings of the IEEE Conference on Computer Vision and Pattern Recognition (CVPR)*, 2004.
Bossu, J., Hautiere, N. and Tarel, J.P., "Rain or Snow Detection in Image Sequences Through Use of a Histogram of Orientation of Streaks", *International Journal on Computer Vision*, vol. 93, pp. 348-367, 2011.
Garg, K. and Nayar, S.K., "When Does a Camera See Rain?", *Proceedings of the IEEE International Conference on Computer Vision (ICCV)*, 2005.
Hase, H., Miyake, K. and Yoneda, M., "Real-time Snowfall Noise Elimination", *IEEE International Conference on Image Processing (ICIP)*, pp. 406-409, 1999.
Wahab, M.H.A., Su,C.H., Zakaria, N. and Salam, R.A., "Review on Raindrop Detection and Removal in Weather Degraded Images", *IEEE International Conference on Computer Science and Information Technology (CSIT)*, pp. 82-88, 2013.
Park, W.J. and Lee, K.H., "Rain Removal Using Kalman Filter in Video", *IEEE International Conference on Smart Manufacturing Application*, pp. 494-497, Apr. 2008.
Wu, Q., Zhang, W. and Vijaya Kumar, B.V.K, "Raindrop Detection and Removal Using Salient Visual Features", *IEEE International Conference on Image Processing (ICIP)*, pp. 941-944, 2012.
Chen, J. and Chau, L.P., "Rain Removal from Dynamic Scene Based on Motion Segmentation", *IEEE International Symposium on Circuits and Systems (ISCAS)*, pp. 2139-2142, 2013.
Xu, J., Zhao, W., Liu, P. and Tang, X., "*Removing rain and snow in a single image using guided filter*", IEEE International Conference on Computer Science and Automation Engineering (CSAE), pp. 304-307, 2012.
http://www.prnewswire.com/news-releases/the-climate-corporation-introduces-climate-basic, press release Nov. 5, 2013.
http://climate.com/products/ciimate-basic, The Climate Technology Platform, Jan. 20, 2014.

* cited by examiner

Original Frame #51

Wavelet Filtered Frame #51

Histogram of image in (a).

Histogram of image in (b).

VISION-BASED SYSTEM FOR DYNAMIC WEATHER DETECTION

FIELD OF THE INVENTION

The present invention relates, in general, to detecting weather events, such as rain, snow, or hail. More specifically, the present invention relates to systems and methods for dynamically detecting a weather event using surveillance cameras, such as those provided by a closed circuit television (CCT) network.

BACKGROUND OF THE INVENTION

In recent years, researchers have investigated detection of dynamic weather events (e.g., rain, snow and hail) in images and video sequences. The majority of investigated approaches focus on removal of weather events from the image sequences, or video sequences. These approaches may be categorized as de-noising methods, or restoration methods, since they consider rain (or snow) as a source of noise.

For example, Tripathi et al. (Tripathi, A. K. and Mukhopadhyay, S., "A probabilistic approach for detection and removal of rain from videos", *IETE Journal of Research*, Vol. 57, No. 1, pp. 82-91, 2011) suggest that analyzing the symmetry of temporal variations in pixel intensity leads to distinct features for separating rain pixels from noise. Pixel temporal profiles affected by the presence of rain typically produce more symmetry than non-rain pixels (e.g., noise, objects). Also, the range of intensity fluctuations due to rain in a scene is much smaller than moving objects in the scene (e.g., traffic and pedestrians).

Wahab et al. (Wahab, M. H. A., Su, C. H., Zakaria, N. and Salam, R. A., "Review on Raindrop Detection and Removal in Weather Degraded Images", *IEEE International Conference on Computer Science and Information Technology* (*CSIT*), pp. 82-88, 2013) review a variety of algorithms related to raindrop detection and removal from images. Their survey, however, is limited as they focus on removing raindrops from a car's windshield in order to improve driver visibility.

Park et al. (Park, W. J. and Lee, K. H., "Rain Removal Using Kalman Filter in Video", *IEEE International Conference on Smart Manufacturing Application*, pp. 494-497, April 2008) introduce a rain removal algorithm using a Kalman Filter. As part of their approach, the authors estimate the intensity of pixels not affected by rain, thereby, restoring pixel values to their original intensity levels. Their approach models the intensity of each pixel with a Kalman Filter.

Wu et al. (Wu, Q., Zhang, W. and Vijaya Kumar, B. V. K, "Raindrop Detection and Removal Using Salient Visual Features", *IEEE International Conference on Image Processing* (*ICIP*), pp. 941-944, 2012) suggest a method for raindrop detection and removal using visual features. Using a forward-looking vehicle mounted camera, their method seeks to remove raindrops from the acquired images. Their method assumes that individual raindrops are visible in the acquired images.

Chen and Chau (Chen, J. and Chau, L. P., "Rain Removal from Dynamic Scene Based on Motion Segmentation", *IEEE International Symposium on Circuits and Systems* (*ISCAS*), pp. 2139-2142, 2013) describe a method for removing rain from dynamic scenes using motion segmentation. Photometric and chromatic properties of rain are used to detect the presence of rain, while motion segmentation is used to separate rain from other objects in the scene.

Wang et al. (Wang, D. J., Chen, T. H., Liau, H. S. and Chen, T. Y., "A DCT-Based Video Object Segmentation Algorithm for Rainy Situation Using Change Detection", *IEEE International Conference on Innovative Computing, Information and Control* (*ICICIC*), 2006) develop a method for removing the effects of rain to improve object detection. Treating rain as a noise source, the authors attempt to remove the rain using a discrete cosine transform (DCT).

Xue et al. (Xue, X., Jin, X., Zhang, C. and Goto, S., "Motion Robust Rain Detection and Removal from Videos", *IEEE MMSP*, pp. 170-174, 2012) suggest a method of rain detection and removal based on spatial and wavelet domain features. Their approach considers the edges of the raindrops and streaks as information, which is captured by using a wavelet decomposition.

Lui et al. (Liu, P., Xu, J., Liu, J. and Tang, X., "Pixel based Temporal Analysis Using Chromatic Property for Removing Rain from Videos", *Computer and Information Sciences*, Vol. 2, No. 1, pp. 53-60, February 2009) suggest a rain removal technique based on temporal analysis and the chromatic property of rain. For detection, the authors segment the video into background and foreground regions. Rain pixels are determined by examining pixel-level differences between an input frame and its background.

Barnum et al. (Barnum, P. C., Narasimhan, S. and Kanade, T., "Analysis of Rain and Snow in Frequency Space", *International Journal on Computer Vision* (*Online*), January 2009) suggest a model-based approach for analyzing dynamic weather conditions. Their approach models the effect of rain or snow in the frequency domain using the Fourier Transform.

Zhao et al. (Zhao, X., Liu, P., Liu, J. and Tang, X., "The Application of Histogram on Rain Detection in Video", *Proceedings of the 11th Joint Conference on Information Sciences*, pp. 1-6, 2008) suggest a rain detection algorithm based on a K-means clustering method. Assuming a Gaussian Mixture Model (GMM) for the intensity histogram of each pixel, clusters are formed separating raindrops from other objects.

Bossu et al. (Bossu, J., Hautiere, N. and Tarel, J. P., "Rain or Snow Detection in Image Sequences Through Use of a Histogram of Orientation of Streaks", *International Journal on Computer Vision*, Vol. 93, pp. 348-367, 2011) suggest a rain detection method based on segmenting objects into blobs. An assumption is made that rain streaks are visible within an image.

Hautière et al. (Hautière, N., Bossu, J., Biogorgne, E., Hilblot, N., Boubezoul, A., Lusetti, B. and Aubert, D., "Sensing the Visibility Range at Low Cost in the SafeSpot Roadside Unit".) suggest a method for detecting dynamic weather events for vision-based traffic monitoring. Their approach suggests separating background and foreground regions in an image. The rain streaks are segmented from the foreground region by applying a gradient-oriented filter followed by a cumulative histogram. Rain or snow is detected by examining peaks in the histogram.

Finally, Tripathi et al. (Tripathi, A. K. and Mukhopadhyay, S., "Meteorological approach for detection and removal of rain from videos", *IET Computer Vision*, Vol. 7, Issue 1, pp. 36-47, 2013) suggest an approach for detection and removal of rain based on meteorological properties of rain, such as shape, area, and aspect ratio of rain drops.

Conventional rain detection methods depend on detecting rain streaks in a video sequence captured by a camera. These methods pose a significant challenge when using low-resolution (spatial and temporal) CCTV (closed circuit television) surveillance cameras used in a traffic monitoring network. Shortcomings of the aforementioned methods include approaches that rely on an ability to adjust camera parameters and limit scene dynamics. In addition, most detection methods analyze an entire image (e.g., rain removal applications), under the assumption that rain is visible throughout an entire field-of-view. More importantly, there is an implicit assumption that these methods depend on high frame rate (greater than 20 fps) video sequences.

In general, many of the dynamic weather detection schemes concentrate on the appearance of rain streaks or snow streaks in the video. Assuming these features are visible, these methods employ time-domain or frequency domain filtering techniques to perform the detection. Model-based approaches are considered that produce analytical expressions for the rain or snow streaks. In addition, most of these methods are not suited for high dynamic environments or cluttered scenes that include moving traffic or other moving objects.

SUMMARY OF THE INVENTION

To meet this and other needs, and in view of its purposes, the present invention provides a method of detecting a dynamic weather event including the steps of:

(a) receiving video images of a scene from a camera;

(b) dividing each of the video images into multiple regions, in which a region is defined by a range of distances from the camera to objects in the scene;

(c) selecting a region;

(d) segmenting the selected region into a plurality of three-dimensional (3D) image patches, in which each 3D image patch includes a time-sequence of T patches, with each patch comprised of N×M pixels, wherein N, M and T are integer numbers;

(e) measuring an image intensity level in each of the 3D image patches;

(f) masking 3D image patches containing image intensity levels that are above a first threshold level, or below a second threshold level;

(g) extracting features in each 3D image patch that is not discarded by the masking step; and (h) in response to the extracted features, making a binary decision on detecting a dynamic weather event.

The dynamic weather event includes at least one of either a raining event, a snowing event, and/or a hailing event.

The step (b) of dividing includes:

dividing an image of the video images into first, second and third regions in a field of view (FOV) of the camera, in which the first region includes objects in the FOV that are closest to the camera, the third region includes objects in the FOV that are furthest from the camera, and the second region includes objects in the FOV that are located between the first region and the second region.

The camera includes a field-of-view (FOV) for imaging a scene of ground objects, in which the FOV includes minimum and maximum look angles corresponding to lower and higher rows of pixels in an image, respectively. Furthermore, the step of dividing each image of the video images into multiple regions includes partitioning the image into at least a first region, in which the first region includes the lower rows of pixels in the image.

The step (c) of selecting includes selecting a first region; and the step (e) of measuring includes: computing the image intensity level by summing pixel energy levels in each of the 3D image patches using the following equation:

$$E_p = \sum_{i=1}^{N_x} \sum_{j=1}^{N_y} \sum_{k=1}^{N_t} W(i, j, k)^2$$

wherein $W(i, j, k)$ denotes coefficients of the image patches, and $E_p$ denotes the energy level of an image patch.

The step (f) of masking includes: providing adaptive first and second threshold levels corresponding, respectively, to positive and negative fluctuations of energy levels; and masking a 3D image match, if the computed image intensity level is above or below the first and second threshold levels.

The step (g) of extracting features includes using a combination of at least three parameters to represent a distribution of statistical features, in which the statistical features include one or more of the following: Haar wavelet, temporal energy, texture, spread, Kurtosis, Rain Scintillation Index, Normalized Cross-Correlation and Discrete Cosine Transform Energy Band Ratios.

Making the binary decision includes outputting a signal representing a weather event is detected, or outputting no signal representing a weather event is not detected.

The method further includes the step of computing, prior to making the binary decision, an output score for a selected region. The output score is a summation of respective scores in each of the 3D image patches in the selected region, and the output score determines a likelihood of having detected a dynamic weather event in the selected region.

The method further includes the step of computing, prior to making the binary decision, a posterior probability of a weather event for a selected region. The posterior probability is a posterior odds ratio test, based on Bayes Law of observations in each of the 3D image patches in the selected region; and the posterior probability determines a probability of having detected a dynamic weather event in the selected region.

Another embodiment of the present invention is a system for detecting rain, snow and/or hail. The system includes a processor, and a memory storing instructions for executing, by the processor, the following steps:

(a) determining an average image intensity level of successive frames of a video, over a first observation time period, to obtain a background image of a scene;

(b) determining differences of intensity levels between successive frames of the video and the background image, over a second observation time period, to select pixels of the scene that include moving objects;

(c) masking pixels of the scene selected to include moving objects to obtain masked pixels;

(d) subtracting the masked pixels from each of successive frames of video to obtain a foreground image of the scene;

(e) extracting multiple features from the foreground image of the scene; and (f) making a binary decision on presence of rain, snow and/or hail, in response to the extracted features.

The average image intensity level is a medium intensity level calculated over each pixel in the successive frames of the video. Each difference of an intensity level is an absolute value. If the absolute value is greater than a user-defined threshold value, then the absolute value denotes motion of an object in the scene.

The system may further execute the following steps:

dividing the foreground image of the scene into multiple regions, in which a region is defined by a range of distances from a camera to objects in the scene viewed by the camera;

selecting a region that includes a range of distances that is closest to the objects viewed by the camera;

segmenting the selected region into three-dimensional (3D) image patches, in which each 3D image patch includes a time-sequence of T patches, with each patch comprised of N×M pixels, wherein N, M and T are integer numbers;

measuring an image intensity level in each of the 3D image patches; and masking 3D image patches containing image intensity levels that are above a first threshold level, or below a second threshold level.

Extracting the multiple features includes extracting the features in each 3D image patch that is not discarded by the masking step. Masking 3D image patches includes: providing adaptive first and second threshold levels corresponding, respectively, to positive and negative fluctuations of energy levels; and masking a 3D image patch, if the measured image intensity level is above or below the first and second threshold levels.

It is understood that the foregoing general description and the following detailed description are exemplary, but are not restrictive, of the invention.

BRIEF DESCRIPTION OF THE FIGURES

The invention may be best understood from the following detailed description when read in connection with the accompanying figures:

FIG. 4c is a histogram of the compressed image shown in FIG. 4a.

DETAILED DESCRIPTION OF THE INVENTION

The present invention provides a system and method of dynamic weather event detection, such as detecting a raining event, a snowing event, or a hailing event. As will be explained, the present invention uses a sequence of images acquired from a CCT (closed circuit television) network that includes low-resolution surveillance cameras. Unlike the aforementioned conventional methods, the present invention only detects the presence or absence (a binary decision) of dynamic weather events in an image or video sequence. Since the output of the present invention is information (rain or no rain), as opposed to another image, the present invention solves a detection problem, versus solving a de-noising problem or image reconstruction problem that requires removal of rain (or snow) from an image. In general, conventional methods require two steps, namely, detection and removal, to provide an output of a restored image. On the other hand, the present invention only requires a binary decision of rain or no rain, snow or no snow, hail or no hail, etc.

The present invention analyzes the global effect of rain on the video by understanding the properties of rain. For example, rain scintillation is apparent throughout an image sequence; therefore, the present invention segments the video into areas, or regions that increase the probability of detecting rain (or snow, or hail).

Figure 1A:
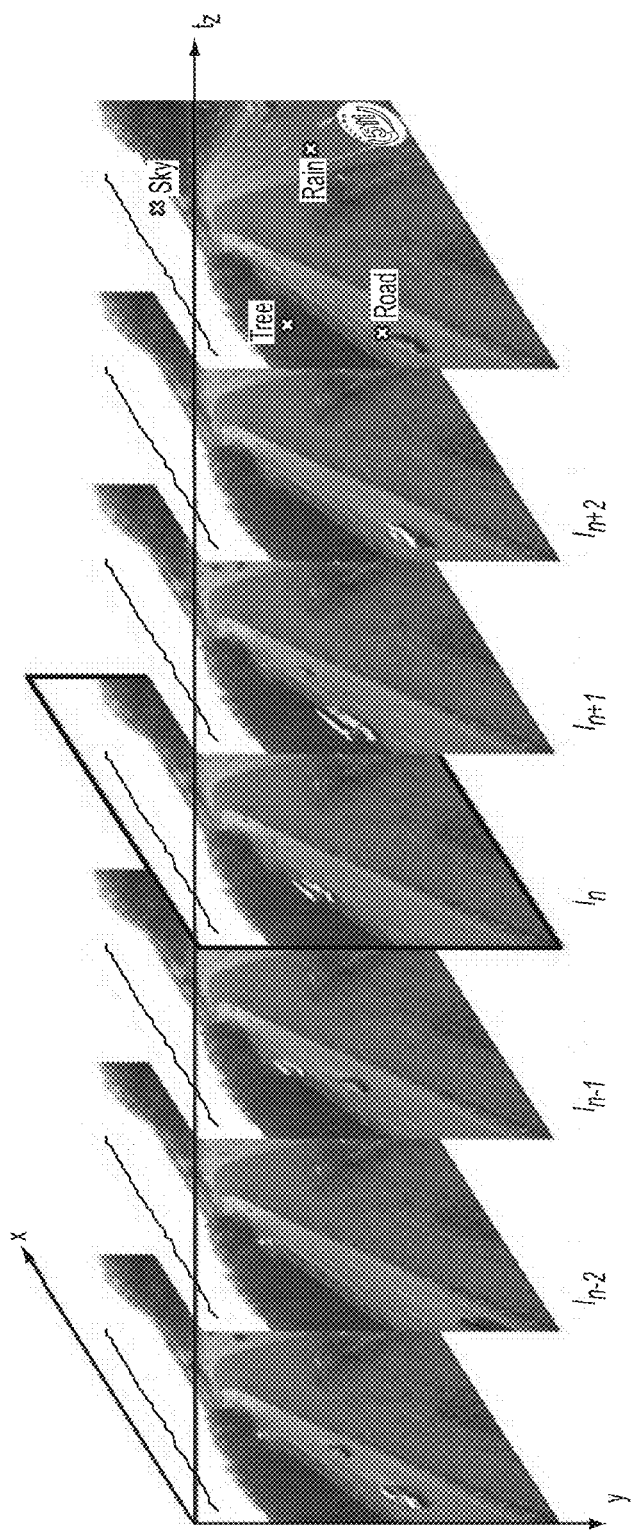
FIG. 1a is a 3D representation of a sequence of video frames.
Figure 1B:
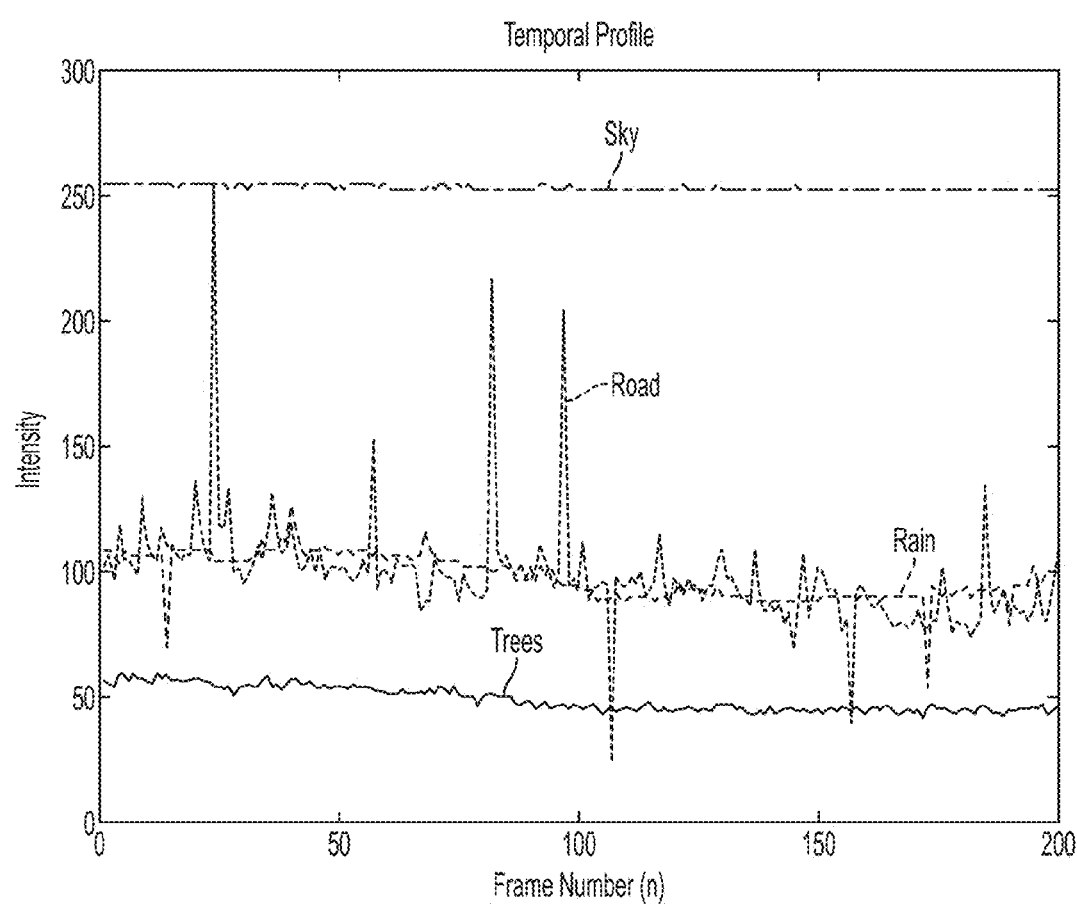
FIG. 1b is an example of a temporal profile (pixel intensity vs. frame number) for selected pixel locations, e.g., sky, road, tree, and rain.

Given the dynamic nature of rain, pixels are randomly affected by rain. FIG. 1a depicts an example of a sequence of video frames. The sequence of frames ($I_n$) is shown in an X, Y, Z Cartesian coordinate system with time, t, depicted along the Z axis. FIG. 1b shows an example of temporal profiles for selected pixel locations (e.g., sky, rain, tree and road) which cause fluctuations in the intensity values of each pixel as a function of frame number, n. As shown, rain scintillation produces small positive intensity changes in pixel intensity. The rain scintillation signal is relatively weak, however, compared to the signal strength produced by traffic on a road. Due to slow camera refresh rates, moving objects in a scene (e.g., vehicles) produce large positive/negative differences, which interfere with detection requirements for rain. Static objects/background in a scene produce clutter and also interfere with rain detection requirements. The present invention, however, reduces false detections by using morphology to remove large/small objects in a scene.

To handle the various poses and scene changes experienced by the camera network, the present invention employs a dynamic rain mask algorithm to automatically segment the video into low and high activity areas. In addition, static objects/background, which act as clutter, are also reduced by the dynamic rain mask algorithm. Unlike conventional methods that employ training and ground-truth, on a pixel-level, to identify individual raindrops or streaks of rain, the present invention measures the effect of rain on the video, instead of detecting individual rain pixels.

In general, different characteristics may be used for rain detection, including photometric, temporal, chromatic and physical characteristics. Photometric effects relate to the optical properties of rain. Temporal effects relate to the dynamic properties of rain, while chromatic effects relate to the manner in which rain interacts with visible light. Physical properties describe the shape, size and velocity of rain. The present invention, however, leverages photometric and temporal characteristics of rain which are independent of scene content. The present invention will now be described below.

Figure 2A:
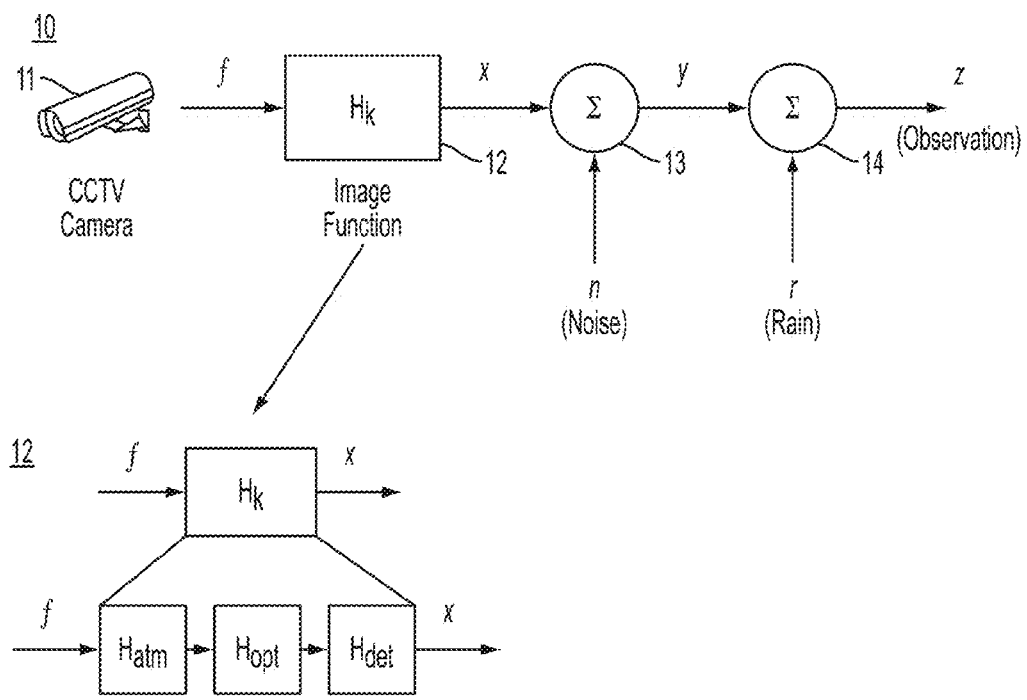
FIG. 2a is a block diagram of a system of the present invention, in accordance with an embodiment of the present invention.
Figure 2B:
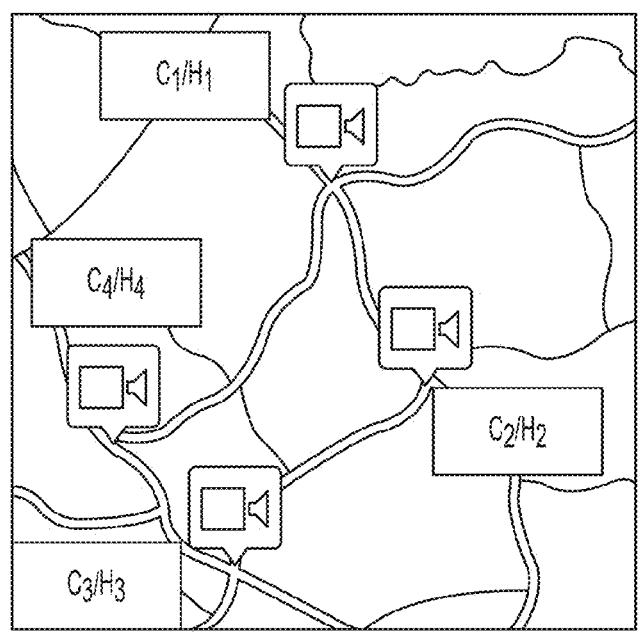
FIG. 2b is an example of a cluster of surveillance cameras that may be incorporated into the system shown in FIG. 2a, in accordance with an embodiment of the present invention.

The present invention models a dynamic weather detection system, as shown in FIG. 2a, generally designated as 10. The system 10 includes at least one camera 11 (four cameras, namely, $C_1$, $C_2$, $C_3$ and $C_4$ in a camera network cluster are shown in FIG. 2b). Also shown are an image transfer function 12 and two serially connected summation components 13 and 14. The system 10 may be modeled according to the following Equations:

$$y=H_k f+n$$

$$y=x+n \quad (1)$$

where y denotes the acquired image, n denotes the background (instrument) noise, and $H_k$ defines the imaging transfer function of the camera.

Assuming that the imaging process may be modeled by a linear time-invariant system, $H_k$ may be decomposed into several components:

$$H_k=H_{atm}H_{opt}H_{det} \quad (2)$$

where $H_{atm}$ denotes the transfer function of the atmosphere, $H_{opt}$ denotes the transfer function of the lens system, and $H_{det}$ denotes the transfer function of the detector used by the camera.

The explicit definition of $H_k$ enables several features for the weather detection system. First, the detection process incorporates properties of the imaging process $H_k$, which varies across the camera network (e.g., geographic locations, cameras and vendors) as illustrated in FIG. 2b. Second, the model shown in FIG. 2a allows system 10 to directly estimate or predict the detection performance across a network (e.g., between different states) as a function of the camera parameters, namely, $H_1$, $H_2$, $H_3$, and $H_4$.

The output of system 10 (FIG. 2a) is given by:

$$z=y+r$$

$$z=x+n+r \quad (3)$$

where z denotes the observation and r denotes the target of interest (e.g., dynamic weather such as rain, snow or hail) which is modeled as an additive term. Given Equation 3, the following binary detection problem may be solved:

$$\begin{cases} H_0: z = y \\ H_1: z = y + r \end{cases} \quad (4)$$

where $H_0$ represents a null hypothesis of no dynamic weather events in the image (scene) and $H_1$ represents a positive case of dynamic weather events in the image.

Figure 3:
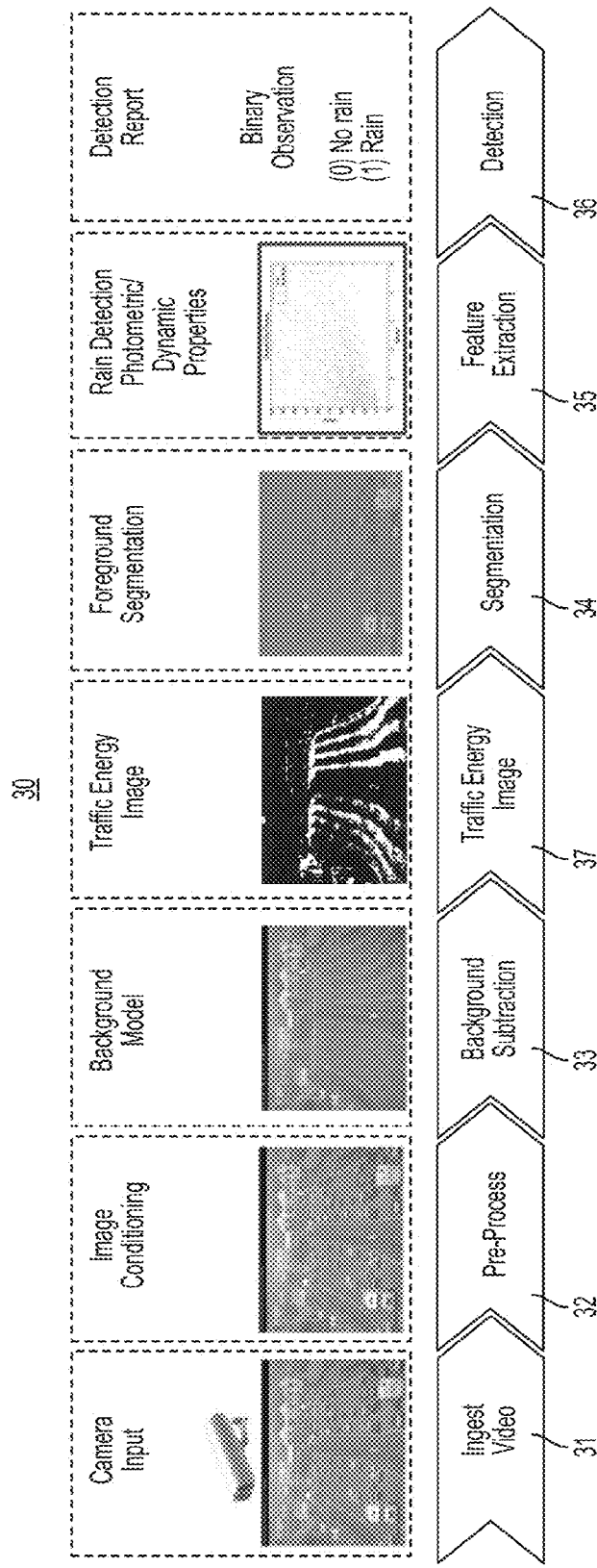
FIG. 3 is a flow diagram illustrating a method of the present invention.

Referring next to FIG. 3, an example of a processing pipeline configured to detect dynamic weather events is shown. The processing pipeline, or method 30 includes ingestion of video data or ingestion of image sequences (step 31) captured by a camera. The next step 32 includes image conditioning by a pre-processing module. The image conditioning may include contrast enhancement, de-noising and/or motion stabilization, prior to any other steps. Exploiting the fact that most of the surveillance cameras are stationary, method 30 uses a background subtraction module for each scene to model the static components of the scene. In this manner, method 30 provides step 33 to remove any static components in the scene.

An additional component used by the invention is shown as a traffic energy image (TEI) module 37, which captures the spatial-temporal traffic pattern of the scene by identifying the location and strength of the traffic motion over an observation time period. The TEI produces a visual map of the scene dynamics, where each pixel represents the level of activity in a spatial region integrated over time.

Distinguishing potential rain pixels from other objects in the scene is performed by segmentation step 34, which is handled by a foreground segmentation module that leverages spatial-temporal properties of dynamic weather events. Dynamic clutter is also removed by the foreground segmentation module, which helps reduce false detections. Photometric properties of rain (snow) are extracted in step 35 by a feature extraction module which separates rain (snow) pixels from background noise pixels. Finally, step 36 determines the presence or absence of rain. This is determined by the detection module, which returns a binary observation occurrence (BOO) result: (0) No Rain or (1) Rain. The BOO result corresponds to the output of Equation 4 used by system 10. More details of these processing components or steps will now be described below.

Pre-Processing Component

The majority of the input images and video frames acquired from the camera network are stored in DCT-based compression formats (e.g., JPEG and MPEG). At high compression ratios, these compression formats are known to produce several image artifacts including blocking (spatial artifacts) and flickering (temporal artifacts). Together, the presence of these artifacts produce false edges and intensity fluctuations in the video that often mimic an appearance of rain (or snow). Therefore, reducing or eliminating these compression artifacts prior to detection helps minimize false alarms and improves the robustness of the detection system.

Figure 4A:
FIG. 4a is an example of a frame representing a compressed image.
Figure 4B:
FIG. 4b is an example of the same frame as shown in FIG. 4a, after being wavelet filtered.
Figure 4C:
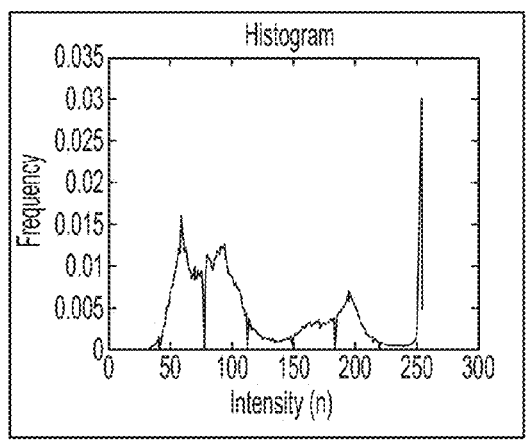
Figure 4D:
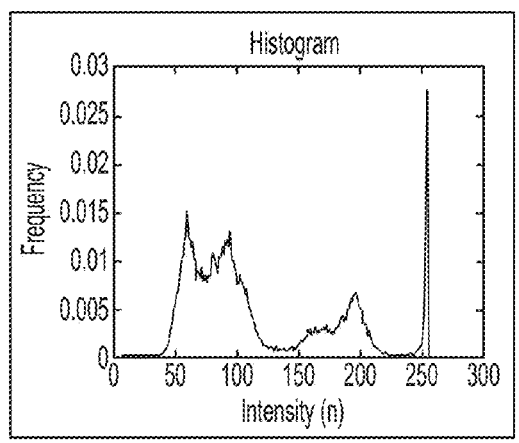
FIG. 4d is a histogram of the wavelet filtered image shown in FIG. 4b.

To pre-process the input image data, the present invention employs a wavelet-based de-noising algorithm to remove the DCT-based compression artifacts from the video frames. FIGS. 4a, 4b, 4c and 4d show examples of results from a de-noising algorithm by referring to two images from a surveillance camera in a CCT network. FIG. 4a shows the original compressed image (frame no. 51) and FIG. 4c shows the resulting histogram of the original compressed image. FIG. 4b shows the wavelet filtered image (frame no. 51) and FIG. 4d shows the resulting histogram of the wavelet filtered image. The improvement to the image may be evident in the histogram of the wavelet filtered image (FIG. 4d) when compared to the histogram of the original image (FIG. 4c).

Background Subtraction

The Background Subtraction Module segments the input video into static and dynamic components. Since the weather events are dynamic, they lie within the dynamic component of the video. Stationary areas of the scene are contained in the static component or the background component.

Given a set of N video frames $\{I_k\}_{k=1}^N$, the background image (B) is estimated according to the following:

$$B(i,j) = \text{median}\{I_1(i,j), \ldots, I_N(i,j)\} \quad (5a)$$

where the median is taken over each pixel (i, j) in the frame. Owing to the dynamic nature of the scene (e.g., traffic, pedestrians, illumination conditions), the background image can be updated to adapt to the complex scene changes.

The Traffic Energy Image (TEI) captures the spatial-temporal traffic pattern of the scene by identifying the location and strength of traffic motion over the observation time period. The TEI produces a visual map of the scene dynamics, where each pixel represents the level of activity in a spatial region integrated over time.

Given the background image generated in Equation (5a), the motion detection for the n-th frame is given by the following:

$$\Delta_n = |I_n - B|; n = 1, \ldots, W \quad (5b)$$

$$M_n = \begin{cases} 0: & \Delta_n \geq T_\sigma \cdot \sigma \\ 1: & \text{else} \end{cases} \quad (5c)$$

where $\Delta_n$ denotes the absolute value of the difference between the input frame and the background image, $M_n$ denotes the binary motion map, $\sigma_n$ denotes the standard deviation of $\Delta_n$ and $T_\sigma$ denotes a user-defined threshold to control the detection. The corresponding TEI is determined by integrating the motion maps over the observation period $$TEI = \sum_{n=1}^{W} M_n \quad (5d)$$

where W is the observation time window (number of frames) and the TEI provides a pixel-based description of the motion (traffic) over this period of time. The dynamic rain mask is a direct by-product of the TEI and is generated according to the following threshold scheme:

$$RainMask(i, j) = \begin{cases} 1: & TEI(i, j) = 0 \\ 0: & TEI(i, j) \neq 0 \end{cases} \quad (5e)$$

where RainMask denotes the rain mask and (i, j) denotes the pixel location. Since the TEI is adaptive to the scene dynamics, the Rain Mask is also adaptive to the traffic and scene motion.

Figure 5A:
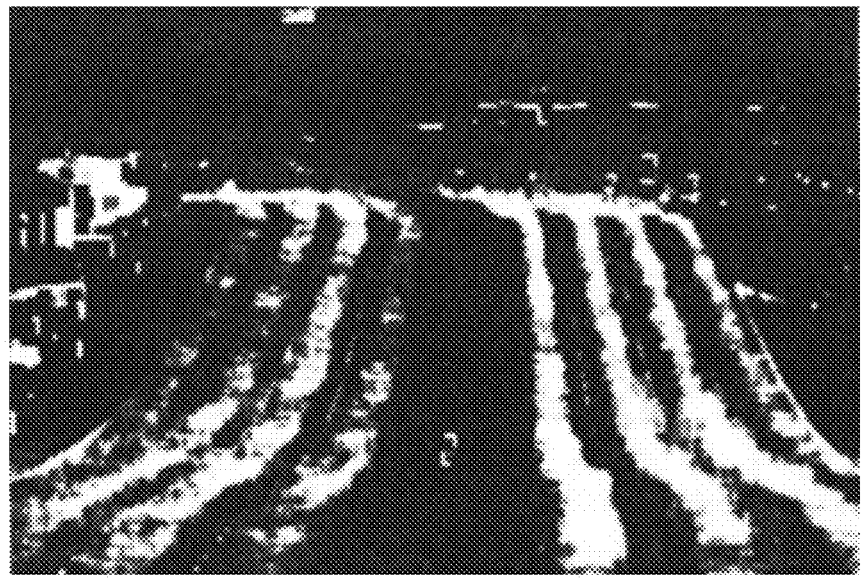
FIG. 5a is an example of a traffic energy image (TEI), in which the spatial-temporal traffic pattern of a scene is captured by identifying location and strength of the traffic motion over an observation period, in accordance with an embodiment of the present invention.
Figure 5B:
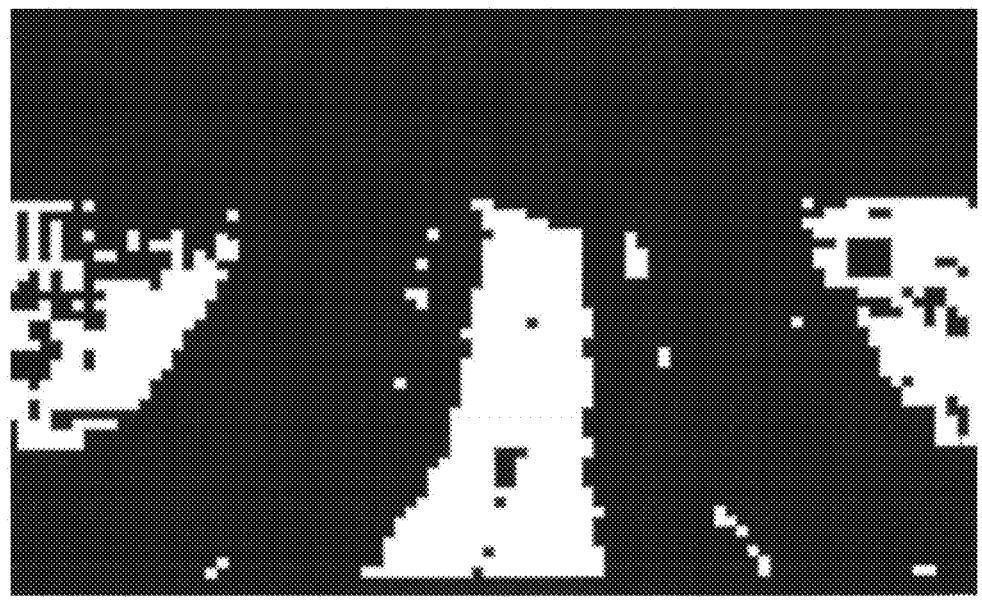
FIG. 5b is an illustration of a rain mask generated from the TEI shown in FIG. 5a, in which the lighter regions represent areas in the scene with no traffic, in accordance with an embodiment of the present invention.

FIG. 5a shows an example of the TEI. The advantages of the TEI include reducing the dynamic clutter from the detection module, a unique spatial-temporal representation of the scene traffic pattern and offers a direct method for generating the dynamic rain mask. FIG. 5b illustrates the corresponding rain mask generated from the TEI. The white regions represent areas in the scene with no traffic and the dark regions in the scene represent areas with traffic.

Segmentation Component

After applying background subtraction, the remaining foreground of the image includes moving objects in the scene (e.g., cars, trucks) along with the possible pixels affected by the presence of rain or snow. Since the weather events are dynamic, the present invention segments the rain from other objects in the scene by localizing the rain within the video frames using a spatial-temporal video segmentation approach. The spatial component detects the local background activity, while the temporal component detects the intensity fluctuations. Furthermore, the method of the invention is scene adaptive and adjusts to local scene content and dynamics. The segmentation component is described below.

The visibility of rain may be defined by the intensity change or gradient induced by the raindrops passing in front of the camera. Given the fast motion of the rain, motion of individual raindrops cannot be tracked by human observers. However, the visual appearance of rain manifests as random spatial patterns, or rain scintillation in the video. This visual effect is a result of intensity fluctuations and varies with scene content and distance from the camera.

Figure 5C:
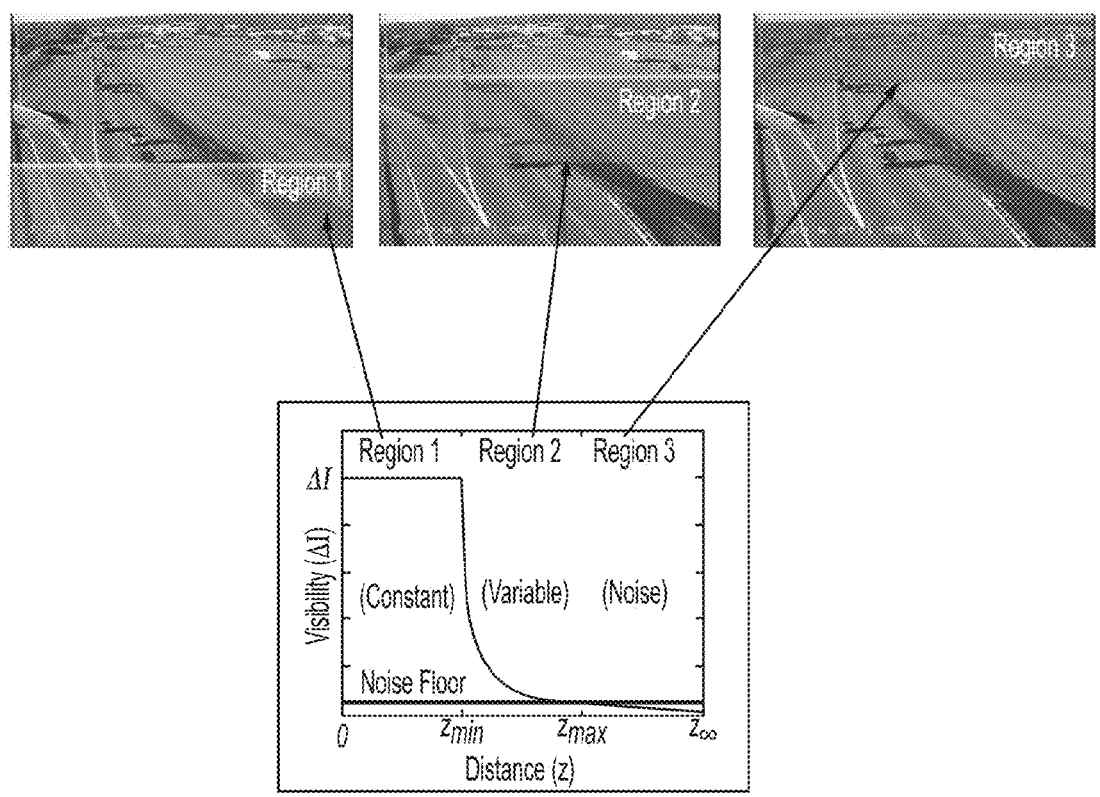
FIG. 5c is an illustration of an image segmented into three regions, namely, region 1, region 2 and region 3, in accordance with an embodiment of the present invention.

FIG. 5c illustrates a video segmentation strategy employed by system 10 to reduce clutter and improve detection. The segmentation step 34 divides each image or frame in a video sequence into three regions:

1) Region 1 (Constant);
2) Region 2 (Variable); and
3) Region 3 (Noise).

Region 1 focuses on the rain closest to the camera. In this region, the camera has the highest chance to capture the rain and the rain is considered to have a fixed intensity level (shown in the figure as a fixed delta of intensity levels). Region 2 focuses on detecting the rain based on intensity level changes that decrease with increasing distance from the camera. Hence, an observation is made by the present invention that the intensity change decreases with an increase in distance from the camera. In addition, the detection of rain varies, or degrades as a function of distance from the camera. Finally, region 3 is furthest from the camera, and the present invention makes no attempt to discern rain from noise in the region. Therefore, Region 3 is not suitable for detection of rain.

Figure 5D:
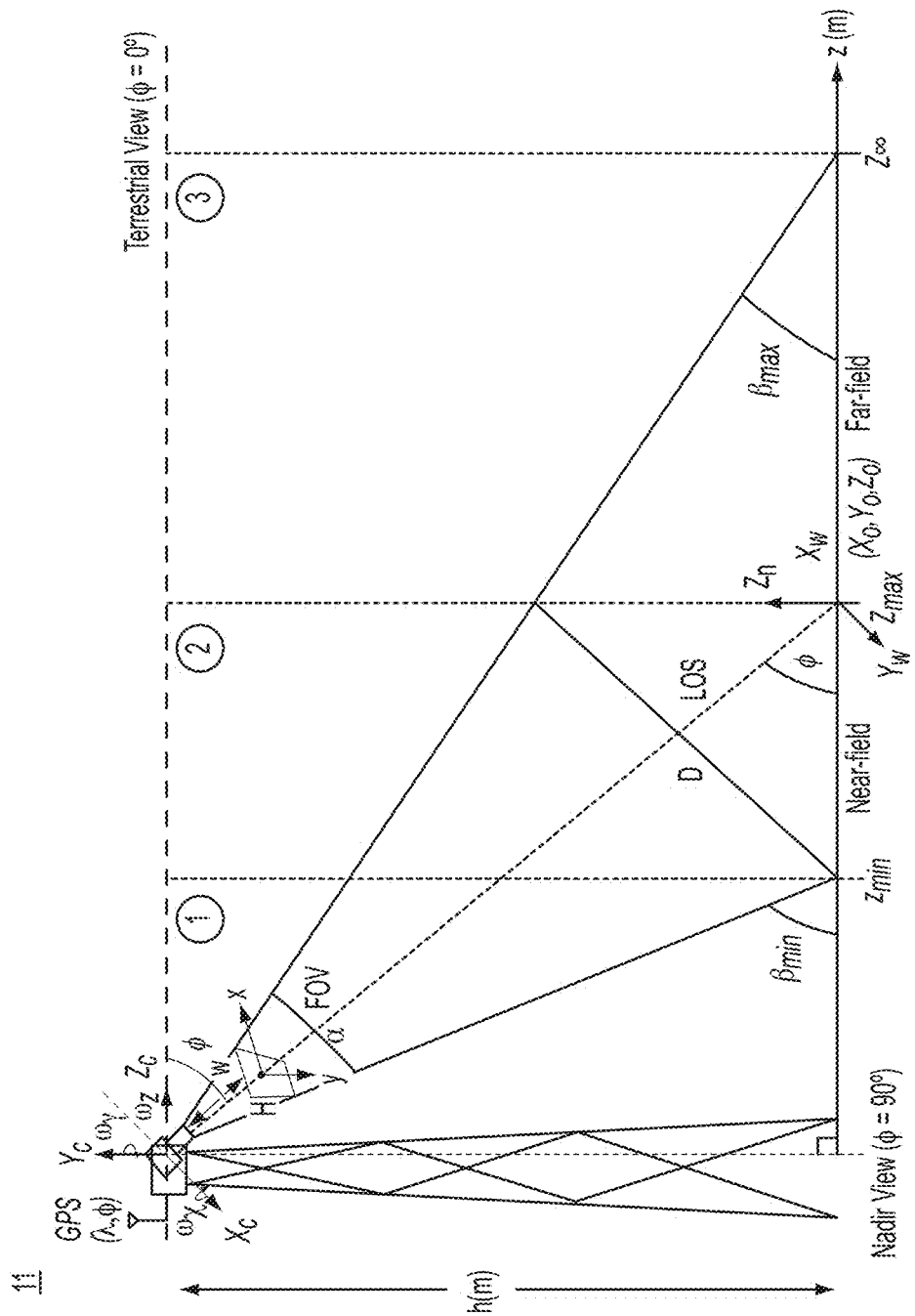
FIG. 5d is an illustration of a field-of-view (FOV) of a camera disposed above horizontal ground and configured in a ground surveillance mode.

Referring next to FIG. 5d, the same three regions are shown partitioned as a function of horizontal ground distance from an elevated camera configured to provide ground surveillance. As shown, camera 11 is disposed at a height of h from horizontal ground and includes a field-of-view (FOV) having a diameter of D. The near-field in the FOV makes an angle of $B_{min}$ with horizontal ground and the far-field in the FOV makes an angle of $B_{max}$ with horizontal ground.

It will be understood that although three regions are shown in FIG. 5d, the present invention also contemplates having only two regions. Thus, region 1, which has the closest scene to the camera, may be partitioned from the other regions in the image, so that only region 1 is used for rain detection; the remaining region or regions may be discarded. As described before, region 1 provides the best opportunity for detecting rain with a low false alarm rate.

Figure 6:
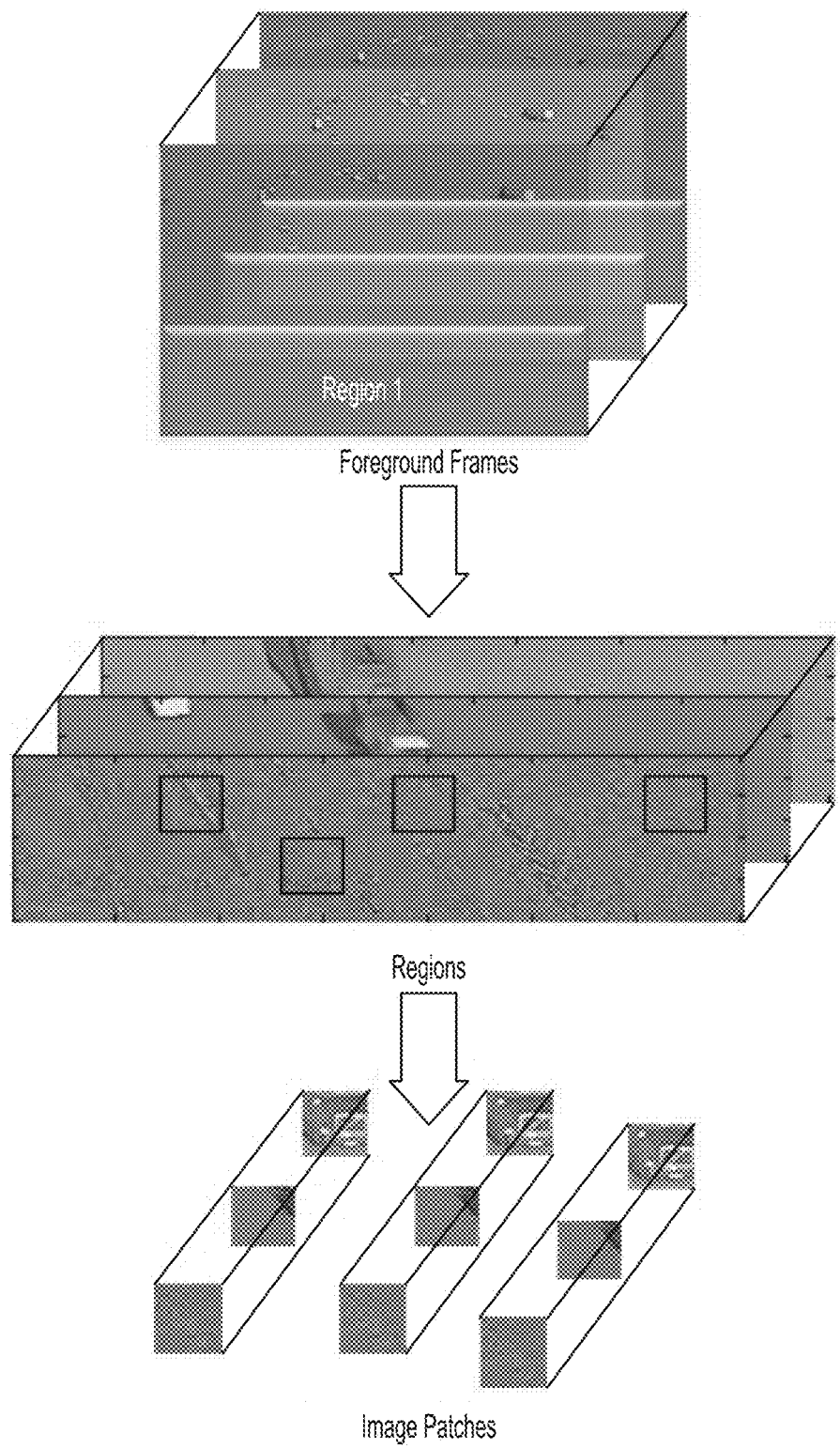
FIG. 6 is an example of a procedure for segmenting a 3D image into foreground frames (region 1 frames), and further segmenting the region 1 frames into 3D image patches, in accordance with an embodiment of the present invention.

After partitioning each image into two, or three regions, the present invention provides further segmentations. FIG. 6 illustrates the procedure for segmenting each selected region (namely, region 1 only; or regions 1 and 2) into spatial-temporal image patches for dynamic clutter removal and detection of rain scintillation. The objective here is to localize low activity areas of a scene, which yield optimal locations to detect the presence of rain (or snow). For example, brighter areas of a scene (e.g., sky) yield low contrast between the rain and the background, while darker areas of a scene (e.g., road, street) yield higher contrast between the rain and the background. As shown in FIG. 6, region 1 of each image is further partitioned into image patches. Each image patch includes $N_x \times N_y$ pixels, which extends in the temporal direction (Z-axis) by $N_t$ frames. Thus, an image patch consists of a 3-dimensional (3D) patch of pixels. It will be appreciated that although only 4 patches are shown in region 1 of FIG. 6, there are many more patches. There may be as many patches as required to encompass all the pixels in region 1. Accordingly, one patch may be adjacent to another patch in region 1.

Figure 7:
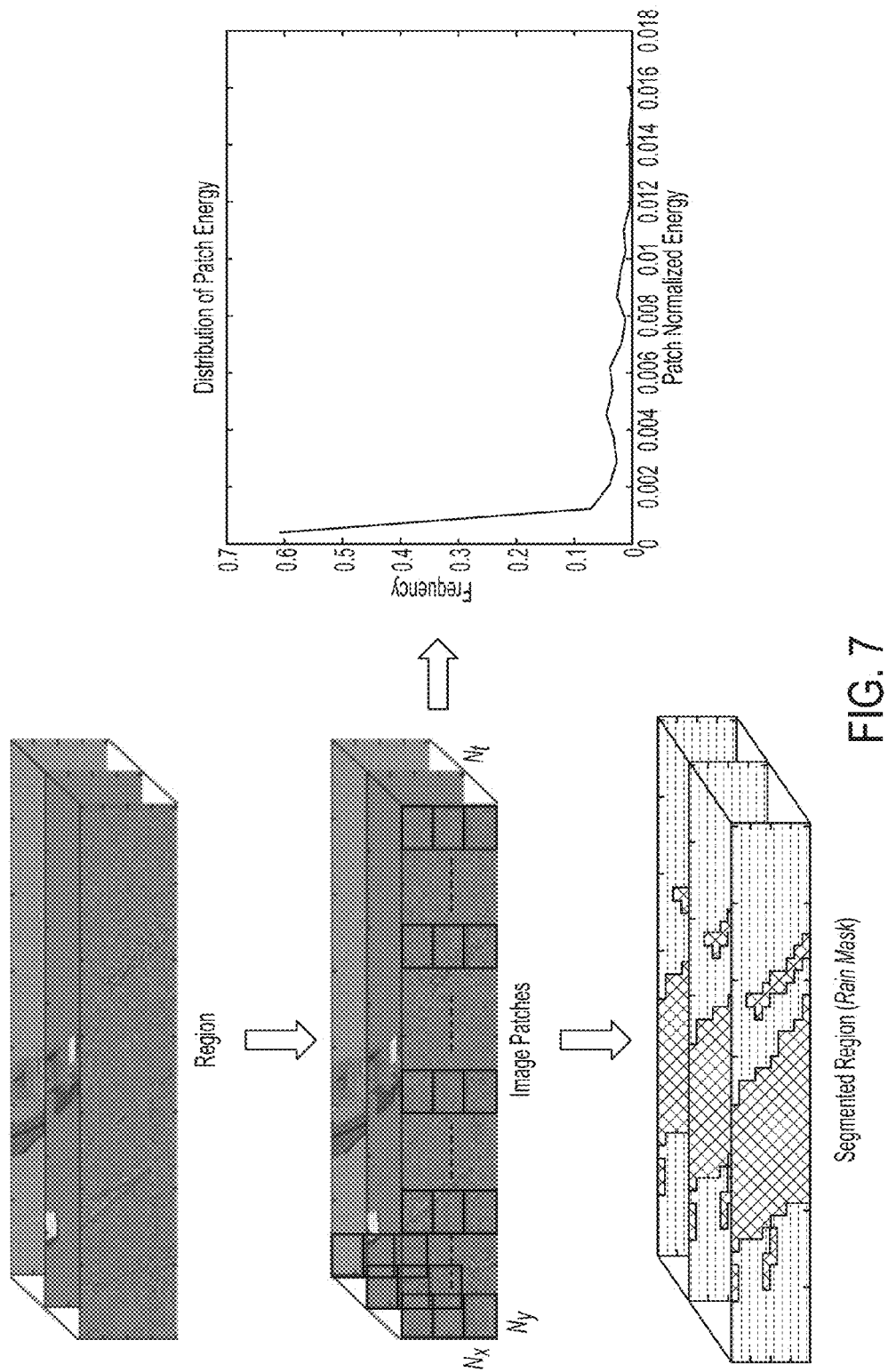
FIG. 7 is an example of a procedure for generating a rain mask for each of the 3D image patches of a region (for example, region 1), in accordance with an embodiment of the present invention.

After the foreground frames (or region 1 frames) are segmented into image patches, a rain mask is generated by the present invention, based on the spatial-temporal activity in each patch. FIG. 7 illustrates a procedure for generating a rain mask. As described before, each region (for example, region 1) is sub-divided into $N_x \times N_y \times N_t$ image patches, where $N_x \times N_y$ denotes the spatial domain and $N_t$ denotes the number of frames in the temporal direction. It will be understood that there may be different values for the number of pixels in a row, the number of pixels in a column, and the number of frames in each 3D image patch (e.g., N×M×P). For each patch, the present invention computes an energy patch level, $E_p$, defined by:

$$E_p = \sum_{i=1}^{N_x} \sum_{j=1}^{N_y} \sum_{k=1}^{N_t} W(i,j,k)^2 \qquad (5f)$$

where W(i, j, k) denotes the coefficients of the image patches in a 3D region.

For all the image patches in the 3D region, an example of a distribution of patch energy is plotted in FIG. 7. Given the energy distribution, the patches are thresholded into low and high activity patches, where high activity patches (e.g., road area) are considered as clutter and removed from the mask. The final rain mask contains the low activity patches, which represent the optimal areas (or patches) to search for the presence of rain. This final rain mask is considered to be a static rain mask.

The aforementioned static rain mask assumes a fixed camera pose for each detection event. However, in practice, the static rain mask is not adequate, due to the random changes in the poses experienced by the cameras. These random changes cause registration errors between the static rain mask and a current scene under observation. Considering the large number of cameras and the unknown time of change, these scenes become difficult to manage with a static rain mask. The present invention, therefore, removes this constraint by using a dynamic rain mask as a preferred approach in the process of detecting rain or snow. An algorithm for generating the dynamic rain mask is described below with respect to FIGS. 8 through 10.

Figures 8A, 8B:
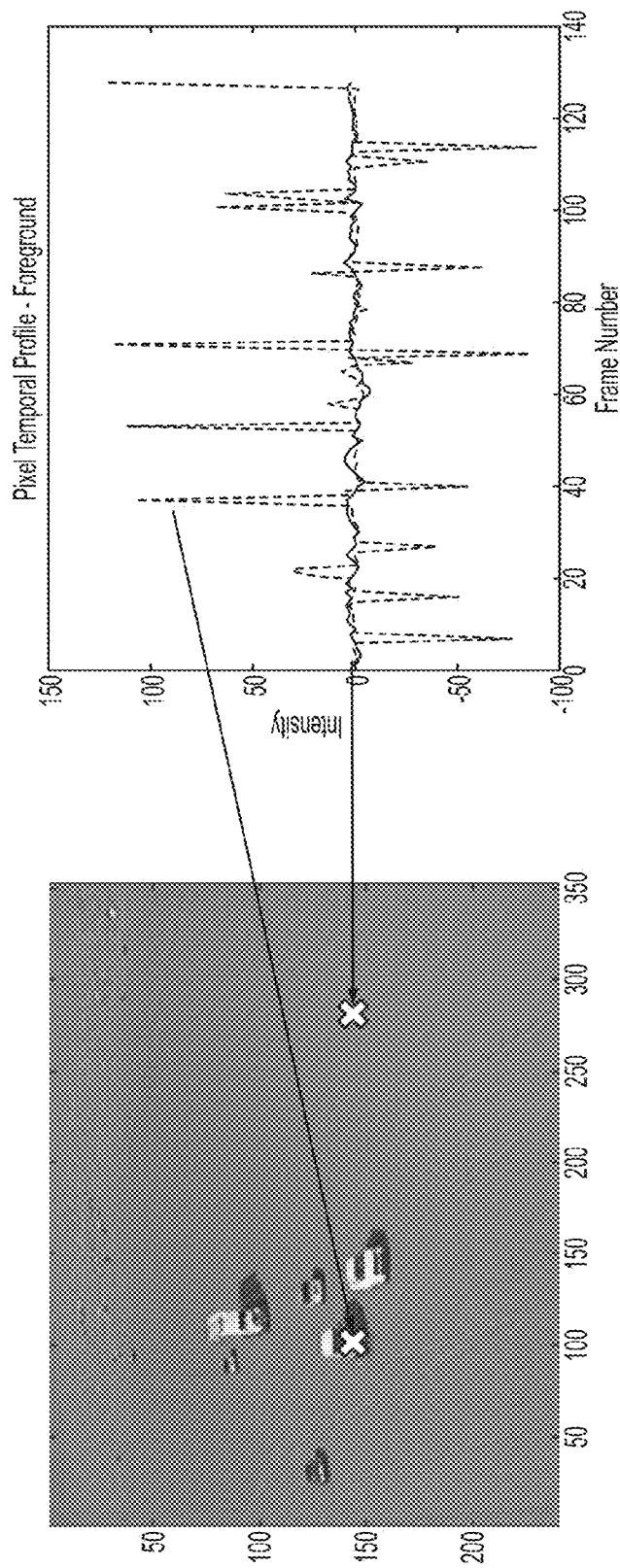
FIG. 8a is an example of the foreground captured by a surveillance camera.
FIG. 8b shows plots of pixel profiles for two different areas (or patches), in which a first area is a high-activity area, whereas a second area is a low-activity area, in accordance with an embodiment of the present invention.

FIG. 8(*a*) shows a foreground image (for example, region 1) obtained by a surveillance camera, in which several vehicles are captured. Independent of camera pose, most scenes contain unwanted motion (also referred to as dynamic clutter) due to traffic and other moving objects (e.g., trees, pedestrians, etc.). Corresponding pixel profiles at two different locations in the image are shown in FIG. 8(*b*) as a function of frame numbers in a video sequence. As shown, the large positive and negative spikes at the first location are induced by moving light and dark vehicles that pass the first location. The small and only positive fluctuations in intensity at the second location, however, is likely due to rain. Two of the properties of rain, thus, are that small and only positive fluctuations are induced by the presence of rain (snow). Accordingly, the present invention filters the foreground image (region 1) so that large variations (spikes) in the image data are detected and removed, prior to feature extraction.

Figure 9:
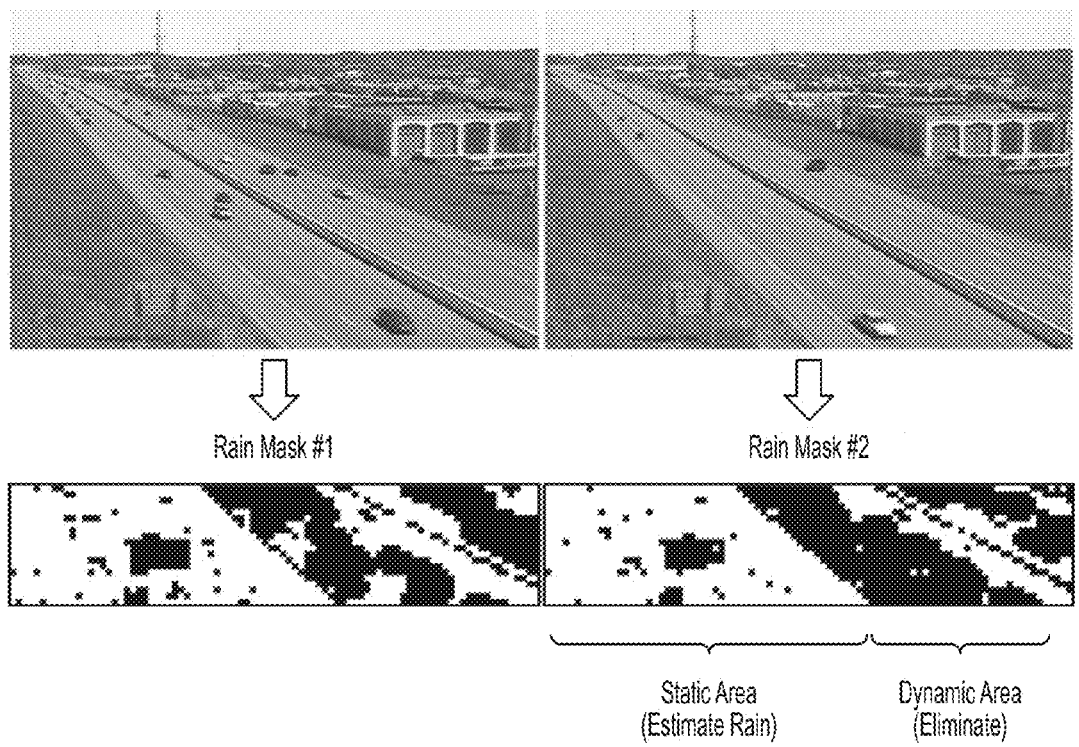
FIG. 9 is an example of a procedure for applying a dynamic rain mask to a highway surveillance camera, in accordance with an embodiment of the present invention.
Figure 10:
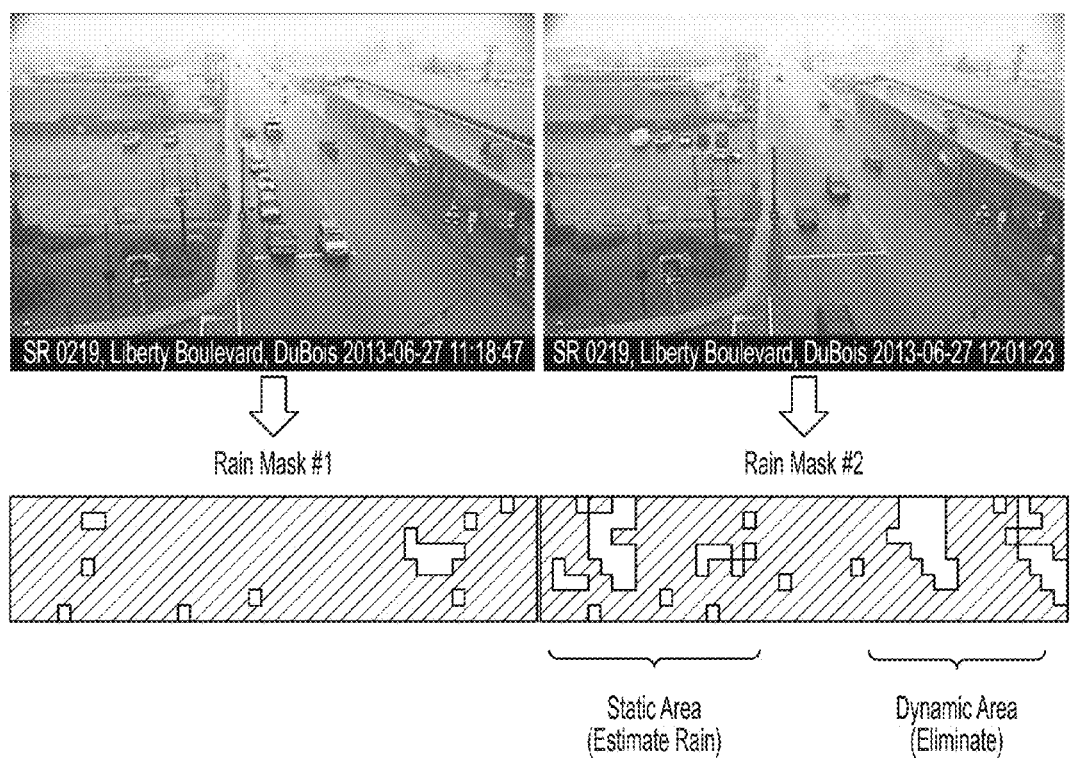
FIG. 10 is an example of a procedure for applying a dynamic rain mask to an urban surveillance camera, in accordance with an embodiment of the present invention.

After filtering and applying an adaptive threshold criteria, both large positive and negative spikes are removed from the image data detected in each region 1 (for example). FIGS. 9 and 10 illustrate two examples of using this adaptive threshold criteria to generate the dynamic mask. The first example in FIG. 9 shows a scene from a highway surveillance camera, while the second example in FIG. 10 shows a scene from an urban surveillance camera. In both examples, the method segments the region (region 1) into dynamic (black) patches and static (white) patches. The black patch areas are eliminated. The white patch areas are used for rain detection. Dynamic patches indicate high activity areas which are most likely caused by vehicles. Static patches, on the other hand, represent low activity areas where the likelihood of detecting scintillation induced by rain increases.

Feature Extraction Component

The feature extraction, step 35 (FIG. 3), is performed after image segmentation into white and black patches. The feature extraction extracts unique features from the image patches to discern rain from noise pixels. Feature extraction will now be described.

Using training data collected from the camera network, the present invention represents each image patch by a set of features designed to capture signal variations or fluctuations induced by dynamic weather events. The system provides a flexible platform for combining multiple features to enhance the detection process.

The objective of the Rain Feature Extraction module is to extract unique features from the image patches to discern rain from noise pixels. Using training data collected from the camera network, the present invention represents each image patch by a set of features designed to capture signal variations, or fluctuations induced by the dynamic weather events. The system provides a flexible platform for combining multiple features to enhance the detection capability. Several features are considered to detect the temporal fluctuations in the pixel intensities. A combination of features use temporal statistics and frequency energy measures including the following features: Normalized Cross-Correlation (NCC), Discrete Cosine Transform Energy Band Ratios (DCT-BER) and Rain Scintillation Index (RSI). The Rain Scintillation Index is defined by the following equation:

$$RSI = \frac{\sigma^2}{\mu^2} \qquad (5g)$$

where $\sigma^2$ denotes the variance of the temporal pixel intensities, and $\mu$ denotes the mean of the temporal pixel intensities.

These features are averaged across of the patches in the rain mask to produce a final feature vector.

Figure 11:
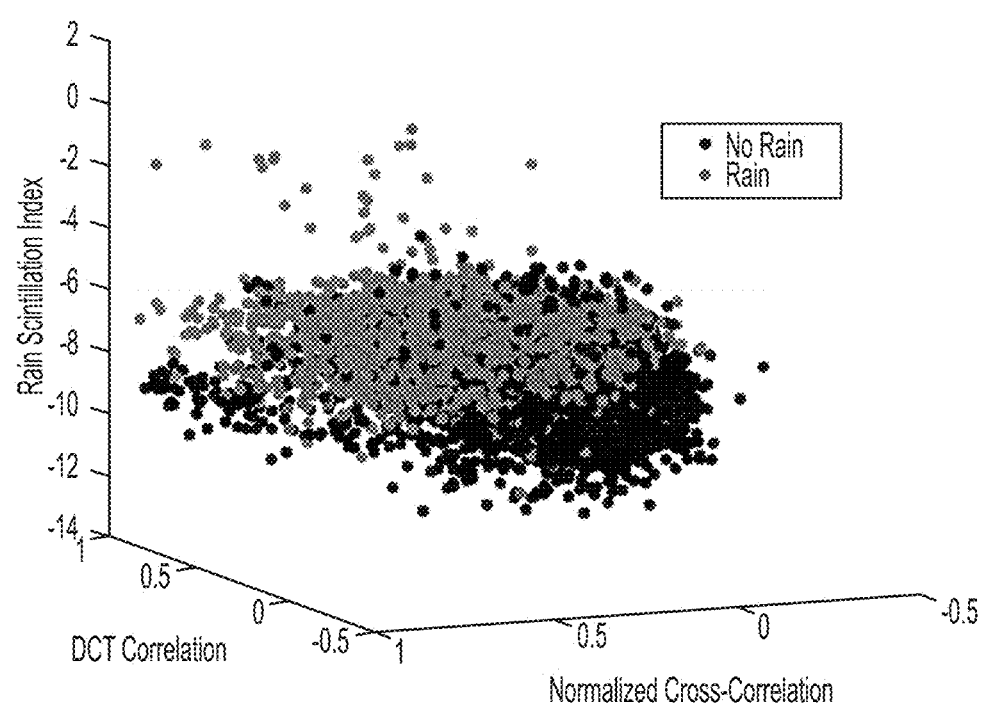
FIG. 11 is an illustration of a 3D scatter plot representing a distribution of rain/no rain statistical features, in accordance with an embodiment of the present invention.

FIG. 11 shows a scatter plot for the feature set representing a 3 dimensional (3D) distribution of the statistical features along with the clustering of the two classes (rain/no-rain).

Detection Component

Unlike the aforementioned approaches that rely on model-based techniques for detection, the present invention employs a machine learning approach, which exploits the data rich environment of the camera network. By using observations or measurements that are collected directly from the camera network, the present invention eliminates the need for any specific model of rain (snow) streaks. This data-driven approach, advantageously, removes any detection error due to inaccurate modeling parameters.

A detection component of the present invention, for example, step 36 in FIG. 3, uses various machine learning algorithms including Neural Networks (NN) and Support Vector Machines (SVM). In addition, the detection component enables a dual-mode detection process, based either on output scores s(x), or on estimated posterior probabilities p(WeatherEvent|x) generated by the machine learning algorithms. The presence or absence of a dynamic weather event is determined by using one or a combination of the dual-mode detection process.

Figure 12:
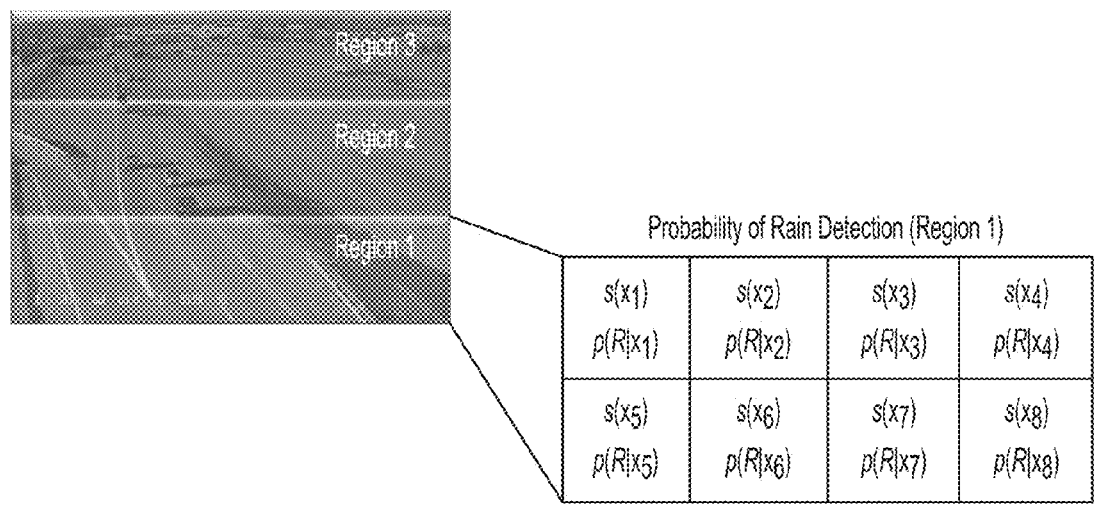
FIG. 12 is an illustration of a video frame being segmented into three regions, in which a detection process divides a region (region 1) into patches, with each patch being provided with an output score, s(x), or a posterior probability score, p(R/x), that estimates the presence/absence of rain, snow, or hail, in accordance with an embodiment of the present invention.

FIG. 12 shows a detection strategy with a video frame segmented into three regions using the segmentation component 34 shown in FIG. 3. As described before, region 1 is closest to the camera. Concentrating on region 1, the present invention further subdivides region 1 into the 3D image patches, as previously described. Assuming each 3D image patch represents an independent observation of the scene, the present invention applies feature extraction to each 3D image patch using the method shown in FIG. 3. As a result, a set of M independent observations, or feature vectors may be generated, as denoted by:

$$\Gamma = \{f_1, \ldots, f_M\}. \quad (6)$$

Each feature vector $f_k$ is applied to a trained machine learning algorithm to generate either an output score, or an estimated posterior probability. One feature vector is generated for each 3D image patch; thus, M represents the total number of image patches in region 1, as shown in FIG. 12. Since each 3D image patch represents an independent observation of the scene, the results from each image patch may be combined to determine the overall probability of detection of the weather event for region 1 (for example).

Given the dual outputs from the machine learning algorithms, the dual-mode detection process uses a Majority Vote test or a Posterior Odds Ratio test (described below). The Majority Vote test is used with the score-based output, where the final detection result (i.e., BOO) is determined by selecting the class (e.g., Rain/No-Rain) having the maximum number of responses.

For the posterior probability output, the goal is to determine the probability of a weather event given the following set of observations:

$$p(\text{WeatherEvent}|\Gamma) = p(\text{WeatherEvent}|x_1, \ldots, x_M). \quad (7)$$

For example, in the case of rain, the present invention forms the following binary detection test statistic:

$$\lambda(\Gamma) = \frac{p(\text{Rain}|\Gamma)}{p(\text{NoRain}|\Gamma)} \underset{<}{\overset{>}{\lessgtr}} \tau; \tau_{min} \leq \tau \leq 1 \quad (8)$$

where $\tau$ denotes the detection threshold. The test criterion, $\lambda(\Gamma)$, in Equation 8 is known as the Posterior Odds Ratio (POR). Equation 8 may also be expressed as:

$$\lambda(\Gamma) = \frac{\prod_{k=1}^{M} p(\text{Rain}|f_k)}{\prod_{k=1}^{M} p(\text{NoRain}|f_k)} \underset{<}{\overset{>}{\lessgtr}} \tau; \tau_{min} \leq \tau \leq 1. \quad (9)$$

Taking a negative log( ) of both sides of Equation 9, a log-space equivalent of the POR may be written as follows:

$$\mathcal{L}(\Gamma) \underset{>}{\overset{<}{\lessgtr}} \mathcal{L}(\tau) \quad (10)$$

where $\mathcal{L}(\Gamma)$ and $\mathcal{L}(\tau)$ are given by:

$$\mathcal{L}(\Gamma) = \sum_{k=1}^{M} \log(p(\text{NoRain}|x_k)) - \sum_{k=1}^{M} \log(p(\text{Rain}|x_k)) \quad (11)$$

and $$\mathcal{L}(\tau) = -\log(\tau); \tau_{min} \leq \tau \leq 1. \quad (12)$$

The dual-mode detection process, described above, offers several benefits for detection of dynamic weather events. First, the detection component is not limited to only rain, but is also applicable to detection of snow, or hail. Second, the dual-mode detection process enables using any machine learning algorithm. Finally, given the data rich environment of the camera network, the detection algorithm may learn directly from real-world data based on what the cameras actually observe. The latter represents a significant advantage over model-based approaches which typically have limited data.

The present invention has many applications. For example, the invention may be applied to ground based weather surveillance, mobile weather stations, road and driver safety information, and emergency response. The invention may also be used with weather observation stations, flood warning systems, weather sensor network systems, construction site monitoring and planning systems, city and state weather response and management systems, local weather alerts and forecasting systems, and traffic management systems.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of detecting a dynamic weather event comprising the steps of:
   receiving video images of a scene from a camera;
   dividing each of the video images into multiple regions, in which a region is defined by a range of distances from the camera to objects in the scene;
   selecting a region from the multiple regions in each of the video images;
   segmenting the selected region into a plurality of three-dimensional (3D) image patches, in which each 3D image patch includes a time-sequence of T patches, with each 3D image patch comprised of N×M pixels, wherein N, M and T are integer numbers;

measuring an image intensity level in each of the 3D image patches;
based on the measured image intensity level, masking 3D image patches containing image intensity levels that are above a first threshold level, or below a second threshold level;
extracting statistical features in each 3D image patch that is not masked;
computing a posterior probability of a weather event for a selected region, wherein the posterior probability:
is a posterior odds ratio test, based on Bayes Law of observations in each of the 3D image patches in the selected region, and
determines a probability of having detected a dynamic weather event in the selected region; and
in response to the extracted statistical features and the computed posterior probability, making a binary decision on detecting a dynamic weather event.

2. The method of claim 1, wherein:
the dynamic weather event includes at least one of a raining event, a snowing event, and a hailing event.

3. The method of claim 1, wherein the step of dividing includes:
dividing an image of the video images into first, second and third regions in a field of view (FOV) of the camera,
wherein the first region includes objects in the FOV that are closest to the camera,
the third region includes objects in the FOV that are furthest from the camera, and
the second region includes objects in the FOV that are located between the first region and the third region.

4. The method of claim 1, wherein:
the camera includes a field-of-view (FOV) for imaging a scene of ground objects, in which the FOV includes minimum and maximum look angles corresponding to lower and higher rows of pixels in an image, respectively; and
the step of dividing each image of the video images into multiple regions includes:
partitioning the image into at least a first region, wherein the first region includes the lower rows of pixels in the image.

5. The method of claim 1, wherein:
the step of selecting includes selecting a first region; and
the step of measuring includes:
computing the image intensity level by summing pixel energy levels in each of the 3D image patches using the following equation:

$$E_p = \sum_{i=1}^{N_x} \sum_{j=1}^{N_y} \sum_{k=1}^{N_t} W(i,j,k)^2$$

wherein W(i, j, k) denotes coefficients of the image patches, and
$E_p$ denotes the energy level of an image patch.

6. The method of claim 1, wherein the step of masking includes:
providing adaptive first and second threshold levels corresponding, respectively, to positive and negative fluctuations of energy levels; and
masking a 3D image patch, if the computed image intensity level is above or below the first and second threshold levels.

7. The method of claim 1, wherein the step of extracting statistical features further includes:
using a combination of at least three parameters to represent a distribution of statistical features identified in the non-discarded 3D image patch, in which the statistical features include one or more of the following:
Haar wavelet, temporal energy, texture, spread, Kurtosis, Rain Scintillation Index, Normalized Cross-Correlation and Discrete Cosine Transform Energy Band Ratios.

8. The method of claim 1, wherein making the binary decision includes:
outputting a signal representing a weather event is detected, or outputting no signal representing a weather event is not detected.

9. The method of claim 1, further including the step of:
computing, prior to making the binary decision, an output score for a selected region;
wherein the output score is a summation of respective scores in each of the 3D image patches in the selected region, and
the output score determines a likelihood of having detected a dynamic weather event in the selected region.

10. A system for detecting rain, snow and/or hail comprising:
a processor, and
a memory storing instructions, wherein when the processor executes the instructions stored in the memory, the processor is configured to:
determine an average image intensity level of successive frames of a video, over a first observation time period, to obtain a background image of a scene;
determine differences of intensity levels of pixels between successive frames of the video and the background image, over a second observation time period;
select pixels of the scene that include moving objects;
mask pixels of the scene selected to include moving objects to obtain masked pixels;
subtract the masked pixels from each of successive frames of video to obtain a foreground image of the scene;
extract multiple statistical features from the foreground image of the scene by detecting temporal fluctuations in pixel intensities of the foreground image based on a combination of statistical features, wherein the statistical features extracted from the foreground image of the scene include at least two of: a normalized cross correlation (NCC), discrete cosine transform energy band ratio, or a rain scintillation index (RSI); and
make a binary decision on a presence of rain, snow and/or hail, in response to the extracted statistical features.

11. The system of claim 10, wherein:
the average image intensity level is a medium intensity level calculated over each pixel in the successive frames of the video,
each difference of an intensity level is an absolute value, and
if the absolute value is greater than a user-defined threshold value, then the absolute value denotes motion of an object in the scene.

12. The system of claim 10, wherein
the RSI is equal to a variance of the temporal fluctuations in the pixel intensities divided by a mean of the temporal fluctuations in the pixel intensities.

13. The system of claim 10, wherein when executing the stored instructions, the processor is further configured to:

divide the foreground image of the scene into multiple regions, in which a region is defined by a range of distances from a camera to objects in the scene viewed by the camera;

select a region that includes a range of distances that is closest to the objects viewed by the camera;

segment the selected region into three-dimensional (3D) image patches, in which each 3D image patch includes a time-sequence of T patches, with each patch comprised of N×M pixels, wherein N, M and T are integer numbers;

measure an image intensity level in each of the 3D image patches; and mask 3D image patches containing image intensity levels that are above a first threshold level, or below a second threshold level; and wherein when extracting the multiple features, the processor is further configured to:

extract the features in each 3D image patch that is not discarded by the masking step.

14. The system of claim 13, wherein the processor, when masking 3D image patches, is further configured to:

provide adaptive first and second threshold levels corresponding, respectively, to positive and negative fluctuations of energy levels; and mask a 3D image patch, if the measured image intensity level is above or below the first and second threshold levels.

15. A method of determining presence of a dynamic weather event, the method comprising the steps of:

receiving frames of video from a camera viewing objects in a scene;

dividing the frames of video into a foreground image and a background image;

further dividing each frame of video of the foreground image into at least two regions, in which a region is defined by a range of distances from the camera to objects in the scene;

selecting a region including closest range of distances from the camera to the objects;

segmenting the selected region into three-dimensional (3D) image patches, in which each 3D image patch includes a time-sequence of T patches, with each patch comprised of N×M pixels, wherein N, M and T are integer numbers;

measuring an image intensity level in each of the 3D image patches; and masking 3D image patches containing image intensity levels that are above a first threshold level, or below a second threshold level;

extracting statistical features in each 3D image patch that is not masked using a combination of statistical features to detect temporal fluctuations in pixel intensities, wherein the statistical features include a normalized cross correlation (NCC), a discrete cosine transform energy band ratio, or a rain scintillation index (RSI), wherein the RSI is equal to a variance of the temporal fluctuations in the pixel intensities divided by a mean of the temporal fluctuations in the pixel intensities; and making a binary decision on the presence of the dynamic weather event, based on the extracted statistical features.

16. The method of claim 15, wherein dividing the frames of video into the foreground image and the background image includes the steps of:

determining an average image intensity level of successive frames of the video, over a first observation time period, to obtain a background image of the scene;

determining differences of intensity levels between successive frames of the video and the background image, over a second observation time period, to select pixels of the scene that include moving objects;

masking pixels of the scene selected to include moving objects to obtain masked pixels; and subtracting the masked pixels from each of successive frames of video to obtain the foreground image of the scene.

17. The method of claim 15, wherein making the binary decision includes:

outputting a signal representing a weather event is detected, or outputting a signal representing a weather event is not detected; and wherein the weather event includes at least one of a raining event, a snowing event and a hailing event.

* * * * *